US009900832B2

(12) United States Patent
Kim et al.

(10) Patent No.: US 9,900,832 B2
(45) Date of Patent: Feb. 20, 2018

(54) METHOD AND AN APPARATUS FOR ACCESS NETWORK SELECTION IN A WIRELESS COMMUNICATION SYSTEM

(71) Applicant: LG ELECTRONICS INC., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 14/074,146

(22) Filed: Nov. 7, 2013

(65) Prior Publication Data

US 2014/0153546 A1    Jun. 5, 2014

Related U.S. Application Data

(60) Provisional application No. 61/723,321, filed on Nov. 7, 2012, provisional application No. 61/751,916, filed on Jan. 13, 2013, provisional application No. 61/764,493, filed on Feb. 13, 2013, provisional application No. 61/765,789, filed on Feb. 17, 2013, provisional application No. 61/768,518, filed on Feb.
(Continued)

(51) Int. Cl.
*H04W 28/08* (2009.01)
*H04W 48/18* (2009.01)

(52) U.S. Cl.
CPC .................. *H04W 48/18* (2013.01)

(58) Field of Classification Search
None
See application file for complete search history.

(56) References Cited

U.S. PATENT DOCUMENTS

| 2011/0072101 A1* | 3/2011 | Forssell ............... H04W 48/18 709/206 |
| 2012/0263036 A1* | 10/2012 | Barclay et al. ............... 370/230 |
| 2013/0012260 A1* | 1/2013 | Salkintzis et al. .......... 455/550.1 |

(Continued)

OTHER PUBLICATIONS

U.S. Appl. No. 61/561,556, dated Nov. 2011, Kovvali et al.*

*Primary Examiner* — Gregory Sefcheck
*Assistant Examiner* — Jenkey Van
(74) *Attorney, Agent, or Firm* — Birch, Stewart, Kolasch & Birch, LLP

(57) ABSTRACT

A wireless communication system is disclosed. More particularly, access network selection scheme in a wireless communication system are disclosed. A method for selecting an access network by a user equipment (UE) may comprise: determining whether at least one cellular access network is overloaded; determining whether at least one wireless local area network (WLAN) access network is overloaded; determining priorities for the at least one cellular access network and at least one WLAN access network; and selecting one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded.

6 Claims, 9 Drawing Sheets

Related U.S. Application Data

24, 2013, provisional application No. 61/802,732, filed on Mar. 17, 2013.

(56) References Cited

U.S. PATENT DOCUMENTS

| | | | |
|---|---|---|---|
| 2013/0143542 A1* | 6/2013 | Kovvali et al. | 455/418 |
| 2013/0203399 A1* | 8/2013 | Gupta | H04W 28/12 |
| | | | 455/418 |
| 2013/0308445 A1* | 11/2013 | Xiang | H04W 28/0231 |
| | | | 370/230 |
| 2013/0339438 A1* | 12/2013 | Cherian | H04W 4/005 |
| | | | 709/204 |
| 2014/0092731 A1* | 4/2014 | Gupta | H04W 52/0258 |
| | | | 370/229 |
| 2014/0092886 A1* | 4/2014 | Gupta | H04W 52/0258 |
| | | | 370/338 |

* cited by examiner (a)

(b)

METHOD AND AN APPARATUS FOR ACCESS NETWORK SELECTION IN A WIRELESS COMMUNICATION SYSTEM

This application claims the benefit of U.S. Provisional Application No. 61/723,321, filed on Nov. 7, 2012, 61/751,916, filed on Jan. 13, 2013, 61/764,493, filed on Feb. 13, 2013, 61/765,789, filed on Feb. 17, 2013, 61/768,518, filed on Feb. 24, 2013, and 61/802,732, filed on Mar. 17, 2013, which are hereby incorporated by reference as if fully set forth herein.

BACKGROUND OF THE INVENTION

Field of the Invention

The present invention relates to a wireless communication system, and more particularly, to a method and an apparatus for access network selection in a wireless communication system.

Discussion of the Related Art

Network environments may include a cellular access network (e.g., 3rd Generation Partnership Project (3GPP) Global System for Mobile communication (GSM), Universal Mobile Telecommunication System (UMTS), Evolved Packet System (EPS), etc.) and a wireless local access network (WLAN). To fully and complementarily utilize a dual accessibility to the cellular access network and the WLAN, demands for dual mode terminals are increasing.

Conventionally, access network selection mechanisms for selecting a WLAN among accessible WLANs are defined based on network loads or congestions. However, the conventional mechanisms do not provide a solution for a case when all of the accessible WLANs are overloaded or congested.

In case of a dual mode terminal, the terminal may select a WLAN access network instead of a cellular access network in case when the cellular access network is congested or the WLAN access network has higher priority (or preferred or user-selected). However, the conventional access network selection mechanisms do not provide a solution for a case when all of the accessible WLANs are overloaded or congested.

SUMMARY OF THE INVENTION

Accordingly, the present invention is directed to a method and an apparatus for access network selection that obviates one or more problems due to limitations and disadvantages of the related art.

An object of the present invention is to provide a method and an apparatus for access network selection to provide efficient usage of network resources and to provide enhanced user experiences.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for selecting an access network by a user equipment (UE) may comprise: determining whether at least one cellular access network is overloaded; determining whether at least one wireless local area network (WLAN) access network is overloaded; determining priorities for the at least one cellular access network and at least one WLAN access network; and selecting one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded.

In another aspect of the present invention, provided herein is a method for selecting an access network by a network node may comprise: determining whether at least one cellular access network is overloaded; determining whether at least one wireless local area network (WLAN) access network is overloaded; determining priorities for the at least one cellular access network and at least one WLAN access network; selecting one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded; and transmitting information on the selected WLAN access network to a user equipment (UE).

In yet another aspect of the present invention, provided herein is a user equipment (UE) for selecting an access network may comprise: a transceiving module; and a processor. The processor may be configured to: determine whether at least one cellular access network is overloaded; determine whether at least one wireless local area network (WLAN) access network is overloaded; determine priorities for the at least one cellular access network and at least one WLAN access network; and select one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded.

In yet another aspect of the present invention, provided herein is a network node for selecting an access network may comprise: a transceiving module; and a processor. The processor may be configured to: determine whether at least one cellular access network is overloaded; determine whether at least one wireless local area network (WLAN) access network is overloaded; determine priorities for the at least one cellular access network and at least one WLAN access network; select one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded; and transmitting, using the transceiving module, information on the selected WLAN access network to a user equipment (UE).

The following matters are commonly applicable to the embodiments of the present invention.

Priorities may be determined for a specific packet data network (PDN) connection or a specific internet protocol (IP) flow.

Specific PDN connection or the specific internet protocol flow may be established via the selected WLAN access network.

At least one WLAN access network may be determined to be overloaded if a value of a load related parameter of the at least one WLAN access network is higher than a predetermined threshold.

Load related parameter may include at least one of: information explicitly indicating that the at least one WLAN is overloaded, information on total number of stations associated with at least one BSS of the at least one WLAN access network, information on the percentage of time at least one access point (AP) of the at least one WLAN access network sensed that the medium was busy, information on the remaining amount of medium time available via explicit admission control, information on backhaul network to which the at least one WLAN is connected, or information on throughput measured by the UE.

At least one cellular access network may be determined to be overloaded if a back-off timer is running for the at least one cellular access network.

Information on the back-off timer may be provided by a network node.

At least one cellular access network may be at least one accessible cellular access network, and at least one WLAN access network is at least one accessible WLAN access network.

UE may be associated with one of the at least one WLAN access network.

Information for access network selection may be provided by a network node.

Network node may be at least one of: a Access Network Discovery and Selection Function (ANDSF), a Policy and Charging Rule Function (PCRF), a Mobility Management Entity (MME), serving GPRS (general packet radio service) supporting node (SGSN), PDN-gateway, Gateway GPRS Support Node (GGSN), Authentication, Authorization and Accounting (AAA) server, Trusted WLAN Access Network (TWAN), a base station, an eNodeB, WLAN access point (AP), or Access Network Query Protocol (ANQP) server.

Information for access network selection includes at least one of: information on priority or preference for the at least one WLAN access network, load status or congestion information of at least one WLAN access network, load status or congestion information of at least one cellular access network, policy or rule information for access network discovery and selection, subscription information, PDN connection information, information on whether to apply Multi Access PDN Connectivity (MAPCON), IP flow information, service information, bearer information, operator policy information, user preference information, local policy information, load status information of a core network, information on a roaming/non-roaming status of the UE, capability of the UE, time information, location information, history information on load status of the at least one WLAN access network, or history information on load information of the at least one cellular access network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
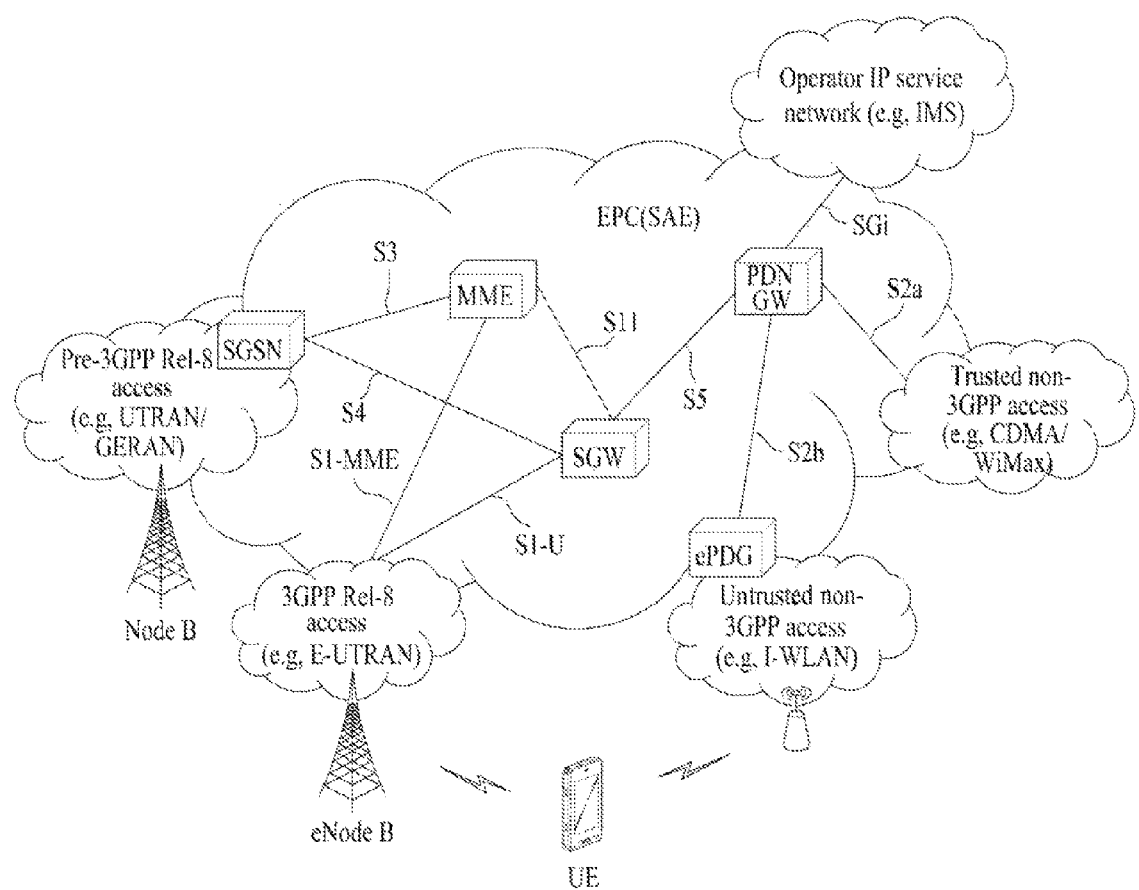
FIG. 1 is a diagram showing the schematic architecture of an evolved packet core (EPC)

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a $3^{rd}$ Generation Partnership Project (3GPP) system, a 3GPP Long Term Evolution (LTE) and LTE-A system, and a 3GPP2 system. That is, the steps or portions, which are not described in order to make the technical spirit of the present invention clear, may be supported by the above documents. In addition, all the terms disclosed in the present document may be described by the above standard documents.

The following technologies may be used in various wireless communication systems. For clarity, 3GPP LTE and 3GPP LTE-A will be focused upon in the following description, but the scope of the present invention is not limited thereto.

Terms used in the present specification are as follows.

UMTS (universal mobile telecommunication system): Third generation mobile communication technology based on global system for mobile communication (GSM) developed by 3GPP.

EPS (evolved packet system): Network system including an evolved packet core (EPC) which is a packet switched (PS) core network based on internet protocol (IP) and an access network such as E-UTRAN, which is evolved from UTRAN.

NodeB: Base station of GERAN/UTRAN, which is mounted outdoors and coverage of which forms a macro cell.

eNodeB: Base station of E-UTRAN, which is mounted outdoors and coverage of which forms a macro cell.

UE: User equipment. The UE may be referred to as a terminal, a mobile equipment (ME), a mobile station (MS), etc. In addition, the UE may be a portable apparatus such as a laptop, a mobile phone, a personal digital assistant (PDA), a smartphone and a multimedia apparatus or a non-portable apparatus such as a vehicle mounted apparatus.

Home NodeB (HNB): Base station of a UMTS network, which is mounted indoors and coverage of which forms a micro cell.

Home eNodeB (HeNB): Base station of an EPS network, which is mounted indoors and coverage of which forms a micro cell.

ANDSF (Access Network Discovery and Selection Function): The ANDSF contains data management and control functionality necessary to provide network discovery and selection assistance data as per operators' policy. The ANDSF is able to initiate data transfer to the UE, based on network triggers, and respond to requests from the UE. It provides functions such as inter-system mobility policy, access network discovery information. The ANDSF in the subscriber's home operator network may interact with other databases such as the HSS user profile information residing in subscriber's home operator network. For details on ANDSF, see 3GPP Technical Specification (TS) 23.402.

MME (mobility management entity): Network node of an EPS network, which performs a mobility management (MM) function and a session management (SM) function.

PDN-GW (packet data network-gateway)/PGW: Network node of an EPS network, which performs a UE IP address allocation function, a packet screening and filtering function and a charging data collection function.

SGW (serving gateway): Network node of an EPS network, which performs mobility anchor, packet routing, idle mode packet buffering, triggering for enabling an MME to page a UE.

PCRF (policy and charging rule function): Network node of an EPS network, which performs policy decision for dynamically applying quality of service (QoS) and charging policy differentiated per service flow.

OAM (operation administration and maintenance): OAM is a set of network administration functions for providing network fault display, performance information, data and diagnostic functions.

NAS (non-access stratum): Upper stratum of a control plane between a UE and an MME. This is a functional layer for signaling between a UE and a core network and exchanging a traffic message in an LTE/UMTS protocol stack, supports UE mobility, and supports a session management procedure for establishing and maintaining an IP connection between a UE and a PDN GW.

NAS configuration MO (NAS configuration management object): MO used to configure parameters associated with NAS functionality with respect to a UE.

PDN (packet data network): Network in which a server supporting a specific service (e.g., a multimedia messaging service (MMS) server, a wireless application protocol (WAP) server, etc.) is located.

PDN connection: Logical connection between a UE and a PDN, which is expressed by one IP address (one IPv4 address and/or one IPv6 prefix).

APN (Access Point Name): String indicating or identifying a PDN. A requested service or a network (PDN) is accessed through a PGW and the APN is the name (string) previously defined in the network in order to find the PGW. For example, the APN may be expressed by internet.mnc012.mcc345.gprs.

RAN (radio access network): Unit including a NodeB, an eNodeB and a radio network controller for controlling the NodeB and the eNodeB in a 3GPP network, which is present between UEs and provides connection to a core network.

HLR (home location register)/HSS (home subscriber server): Database having subscriber information in a 3GPP network. The HSS may perform functions such as configuration storage, identity management and user state storage.

PLMN (public land mobile network): Network configured for the purpose of providing a mobile communication service to individuals. This network may be configured on a per operator basis.

NAS level congestion control: Congestion or overload control function of an EPS network composed of APN based congestion control and general NAS level mobility management control.

MM back-off timer (mobility management back-off timer): Mobility management back-off timer used to control congestion when congestion occurs in a network. While the MM back-off timer runs, a UE is set so as not to perform attach, location information update (e.g., tracking area update (TAU)), routing area update (RAU), service request/extended service request, etc. (in case of an emergency bearer service, a paging response in an existing region, or a multimedia priority service (MPS), even when the MM back-off timer runs, the UE is set to make a request). Regarding operations related to a UE receiving MM back-off timer (e.g., T3346), see 3GPP TS 23.401, TS 23.060, TS 24.301, TS 24.008.

SM back-off timer (session management back-off timer): Session control back-off timer used to control congestion when congestion occurs in a network. While the SM back-off timer runs, a UE is set so as not to perform establishment or change of a session based on an associated APN, etc. (in case of an emergency bearer service or an MPS, even when the SM back-off timer runs, the UE is set to make a request). Regarding operations related to a UE receiving SM back-off timer (e.g., T3396), see 3GPP TS 23.401, TS 23.060, TS 24.301, TS 24.008.

TA (tracking area): Registration area of a UE in an EPS network. The TA is identified by a tracking area identity (TAI).

RA (routing area): Registration area of a UE for a packet core network domain in a GPRS/UMTS network. The RA is identified by a routing area identity (RAI).

Hereinafter, a description will be given based on the above-described terms.

FIG. 1 is a diagram showing the schematic architecture of an evolved packet core (EPC).

The EPC is a fundamental element of system architecture evolution (SAE) for improving 3GPP performance SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, a UE having IP capability and a UE may be connected through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and is an element which performs a function for maintaining a data path between an eNodeB and a PDG GW. In addition, if a UE moves over a region served by an eNodeB, the SGW serves as a local mobility anchor point. That is, packets may be routed through the SGW for mobility in an evolved universal terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMAX network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, UE-to-network session handling, idle UE location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a UE having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | Reference point between MME and SGSN. Enables user and bearer information exchange for inter 3GPP access network mobility in idle and/or active state. This reference point can be used intra-PLMN or inter-PLMN (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |

TABLE 1-continued

| Reference point | Description |
| --- | --- |
| S11 | Reference point between MME and SGW |
| SGi | Reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDN GW and mobility support to a user plane.

Figure 2:
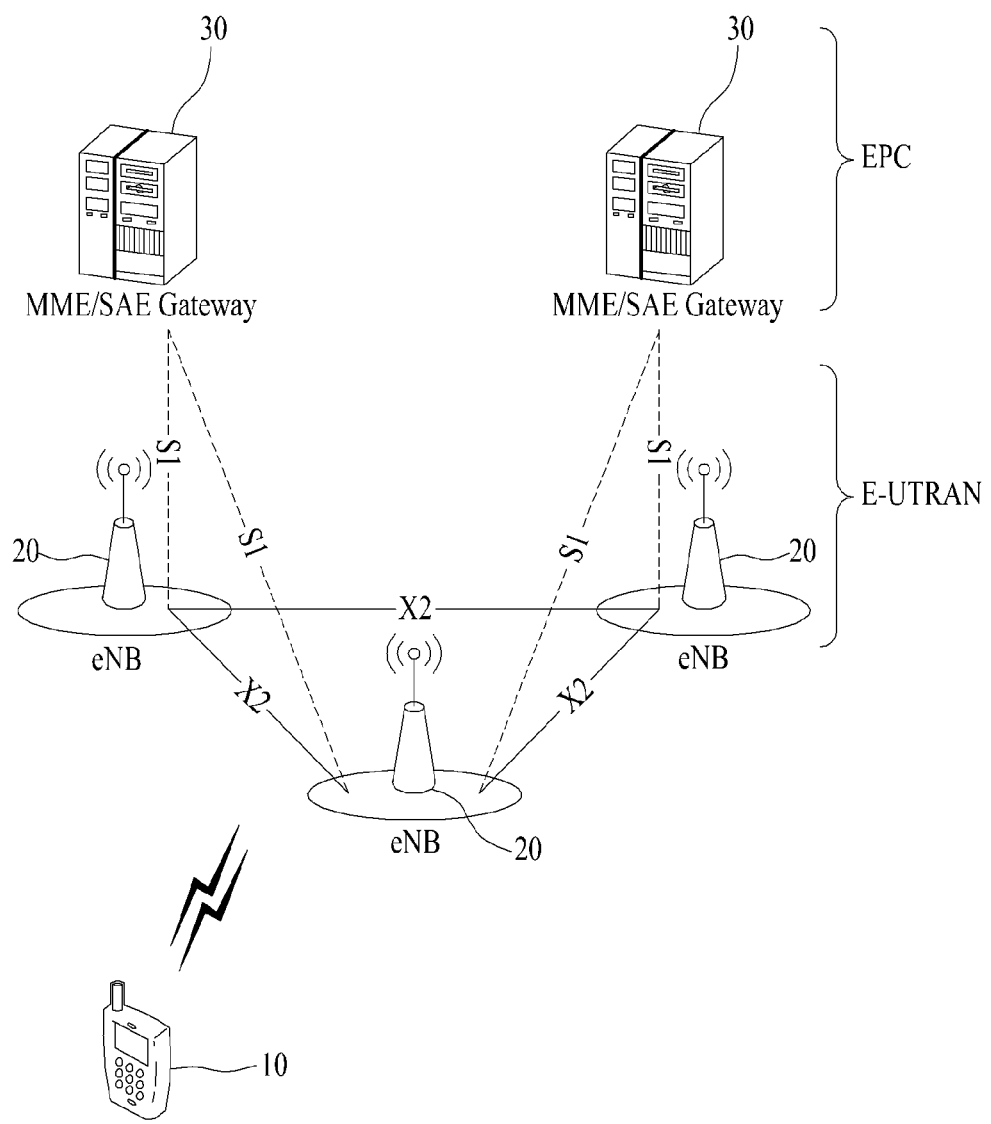
FIG. 2 is a diagram illustrating a network structure of an evolved universal terrestrial radio access network (E-UTRAN) which connects to EPC.

FIG. 2 is a diagram illustrating a network structure of an evolved universal terrestrial radio access network (E-UTRAN) which connects to EPC.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS has been developed by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a UE as an upper-level requirement.

Referring to FIG. 2, the combination of E-UTRAN and EPC may be also referred to as an LTE system or EPS. The communication network is widely deployed to provide a variety of communication services such as voice (VoIP) through IMS and packet data.

As illustrated in FIG. 2, the EPS includes an evolved universal terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network. SAE gateway includes SGW and PDN GW.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 3:
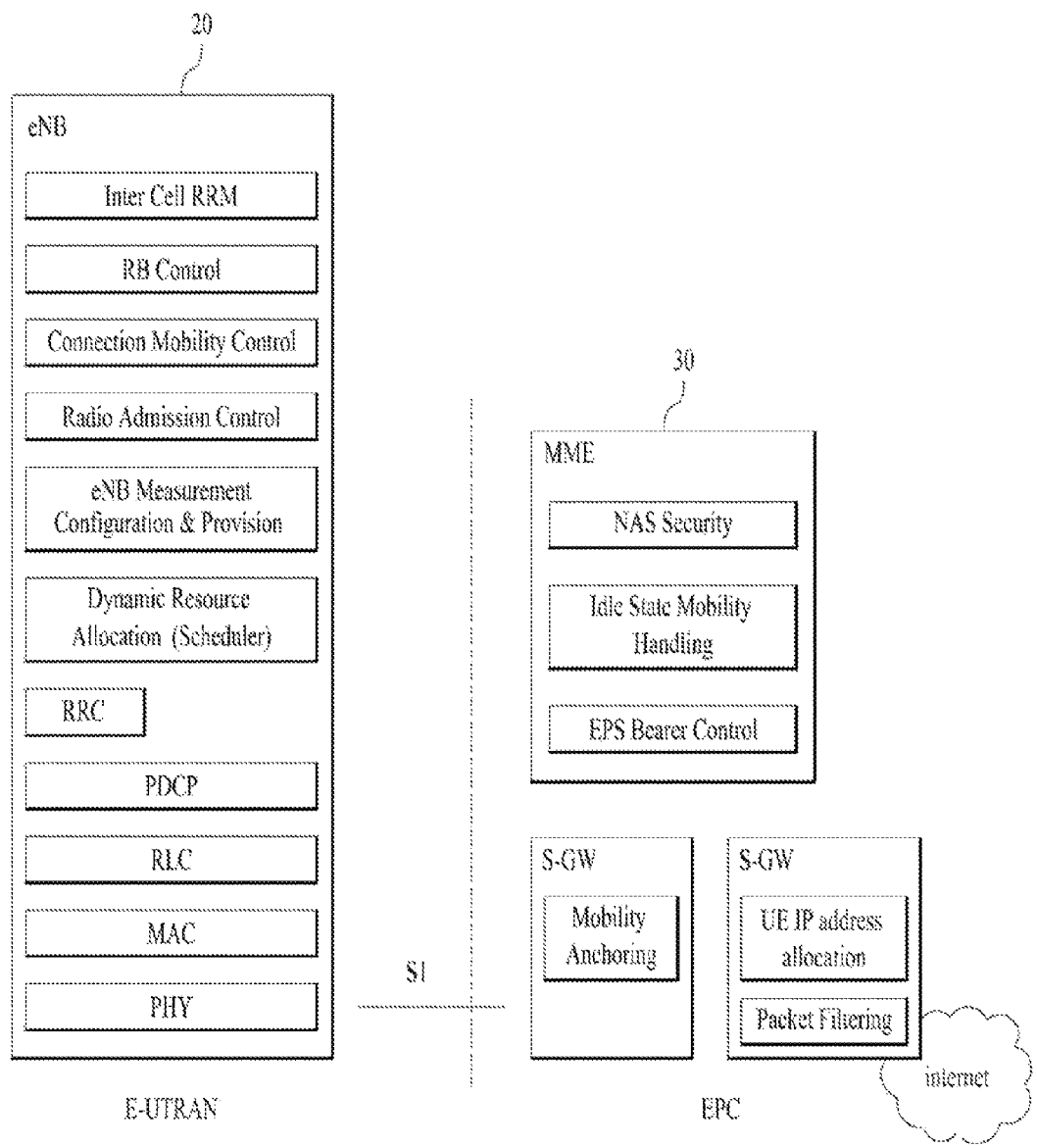
FIG. 3 is a block diagram depicting architecture of a typical E-UTRAN and a typical EPC.

FIG. 3 is a block diagram depicting architecture of a typical E-UTRAN and a typical EPC.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 4:
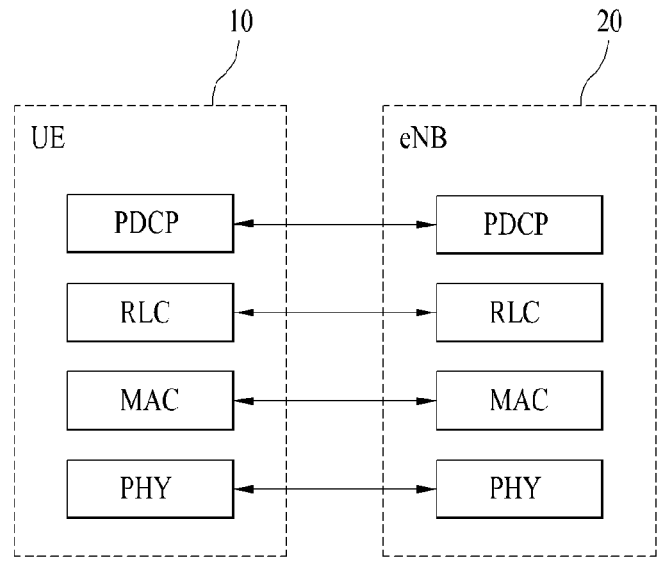
FIGS. 4(a) and 4(b) are block diagrams depicting the user-plane protocol and the control-plane protocol stack for the E-UTRAN
Figure 4:
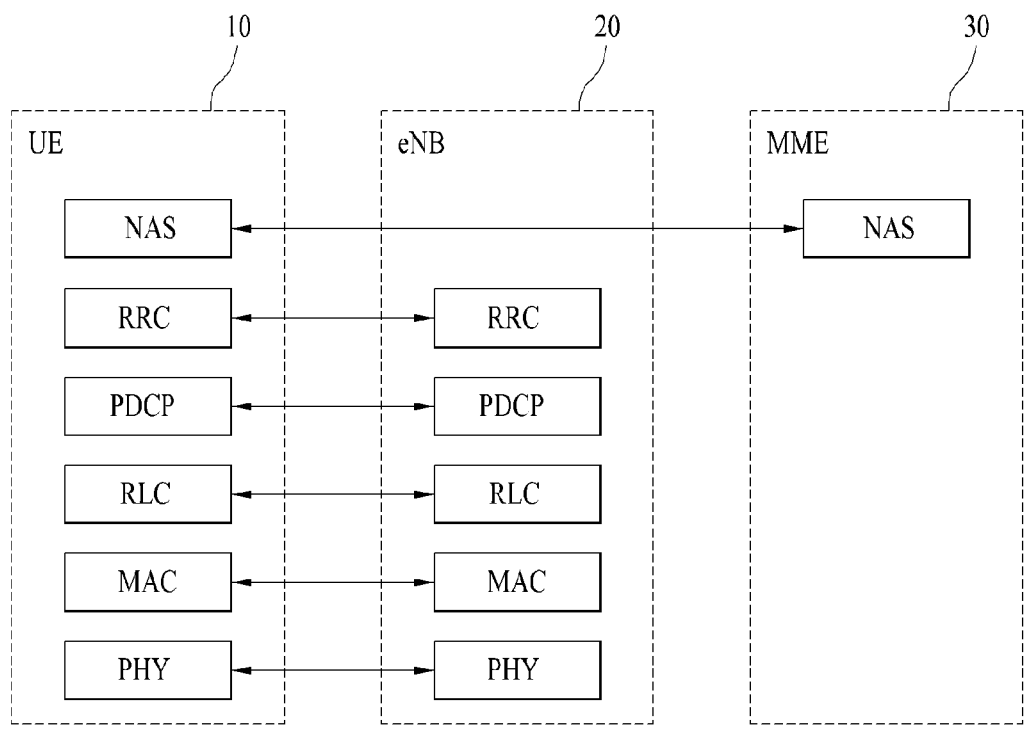

FIGS. 4(a) and 4(b) are block diagrams depicting the user-plane protocol and the control-plane protocol stack for the E-UMTS.

As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 4(a) and 4(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the UE and the UTRAN.

As illustrated in FIG. 4(a), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 4(b), the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 may report channel quality information and feedback information to the eNodeB.

In RRC_CONNECTED state, the E-UTRAN knows the cell to which the UE 10 belongs. Therefore, the network may transmit and/or receive data to/from UE 10, the network may control mobility (handover and inter-Radio Access Technology (inter-RAT) cell change order to GERAN with Network Assisted Cell Change (NACC)) of the UE, and the network may perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 5:
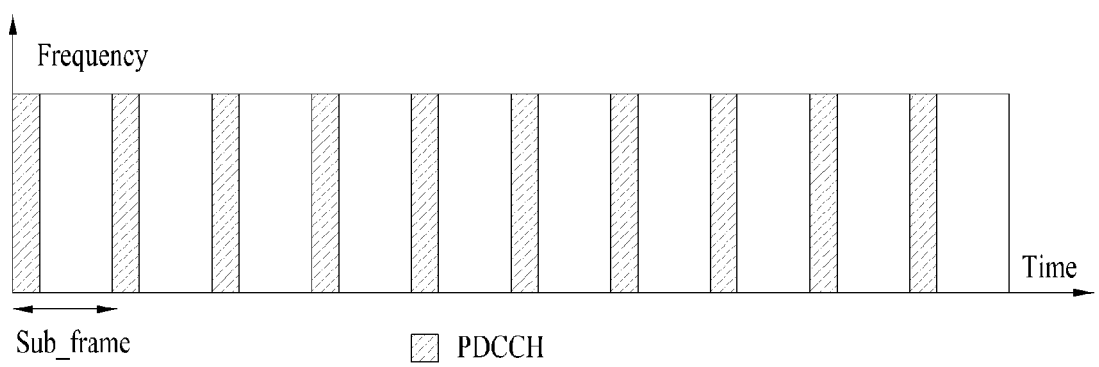
FIG. 5 is a diagram depicting structure of a physical channel.

FIG. 5 is a diagram depicting structure of a physical channel.

A physical channel transfers signaling and data between layer L1 of a UE and eNB. As illustrated in FIG. 5, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, may be used for downlink control channel (PDCCH). PDCCHs carries dynamic allocated resources, such as PRBs and MCS A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multi-cast Traffic Channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include a DCCH that may be mapped to UL-SCH, a DTCH that may be mapped to UL-SCH and a CCCH that may be mapped to UL-SCH. Downlink connections between logical channels and transport channels include a BCCH that may be mapped to BCH or DL-SCH, a PCCH that may be mapped to PCH, a DCCH that may be mapped to DL-SCH, and a DTCH that may be mapped to DL-SCH, a MCCH that may be mapped to MCH, and a MTCH that may be mapped to MCH.

It is known that different cause values may be mapped on the signature sequence used to send messages between a UE and eNB and that either Channel Quality Indicator (CQI) or path loss and cause or message size are candidates for inclusion in the initial preamble.

Figure 6:
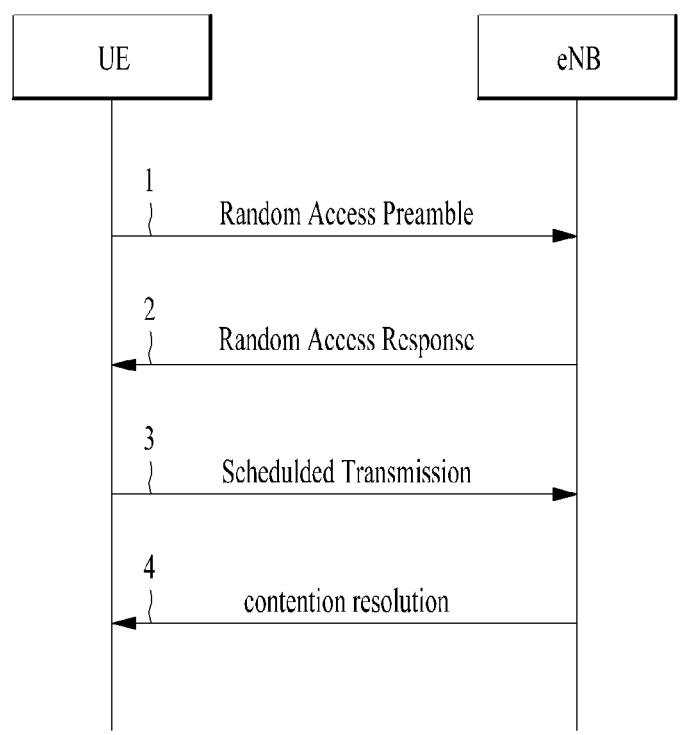
FIG. 6 is a diagram illustrating a random access procedure for E-UTRAN initial access.

FIG. 6 is a diagram illustrating a random access procedure for E-UTRAN initial access.

FIG. 6 illustrates different messages exchanged between a UE and eNB during initial access. When a UE wishes to access the network and determines a message to be transmitted, the message may be linked to a purpose and a cause value may be determined. The size of the ideal message number 3 illustrated in FIG. 6 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference may be determined only in the eNodeB and, therefore, must be broadcast by the eNodeB and received by the UE prior to the transmission of the preamble. The uplink path loss may be considered to be similar to the downlink path loss and may be estimated by the UE from the received Rx (receiver) signal strength when the transmit power of some pilot sequence of the cell is known to the UE.

The required uplink SNR for the detection of the preamble would typically depend on the eNodeB configuration, such as a number of Rx antennas and receiver performance. There may be advantages to transmitting the rather static Transmit power of the pilot and the necessary uplink SNR separately form the varying uplink interference and possibly the power offset required between the preamble and the message.

The initial transmission power of the preamble may be roughly calculated according to the following formula: [Transmit power=TransmitPilot−RxPilot+ULlnterference+Offset+SNRRequired].

Therefore, any combination of SNRRequired, ULlnterference, TransmitPilot and Offset may be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE may be detected even if the initially estimated transmission power for the preamble is not adequate. Another preamble will most likely be transmitted if no acknowledgement or a negative acknowledgement is received by the UE before the next random access attempt. The transmit power of the preamble may be increased, and/or the preamble may be transmitted on a different uplink frequency in order to increase the probability of detection. Therefore, the actual transmit power of the preamble that will be detected does not necessarily correspond to the initial transmit power of the preamble as initially calculated by the UE.

The UE must determine the possible uplink transport format The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

Figure 7:
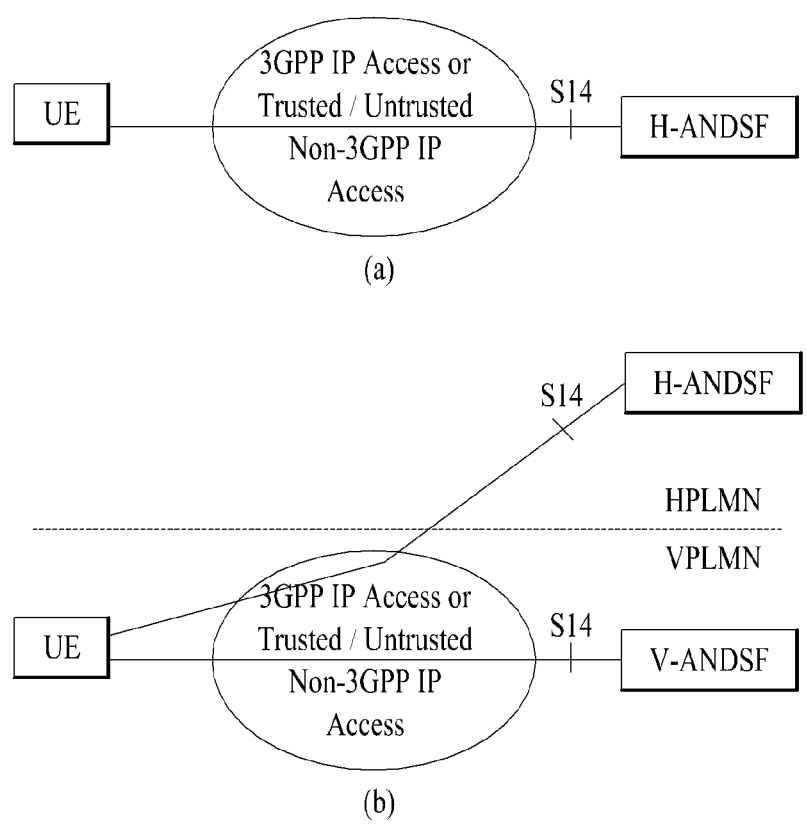
FIGS. 7(a) and 7(b) are block diagrams depicting architectures used for access network discovery and selection.

FIGS. 7(a) and 7(b) are block diagrams depicting architectures used for access network discovery and selection.

FIG. 7(a) illustrates a non-roaming architecture for Access Network Discovery and Selection Functions (ANDSF). FIG. 7(b) illustrates a roaming architecture for ANDSF.

The architecture is based on a new network element called Access Network Discovery and Selection Function (ANDSF). An ANDSF element located in the home PLMN of a UE is referred to as the Home-ANDSF (H-ANDSF) for this UE, whereas an ANDSF element located in the visited PLMN of a UE is referred to as the Visited-ANDSF (V-ANDSF) for this UE. Unless otherwise specified, the term ANDSF is used to refer to both an H-ANDSF and a V-ANDSF. In the examples of FIGS. 7(a) and 7(b), the support and the use of these functions and interfaces are optional.

Congestion Control in a Cellular Access Network

In this document, the term "a cellular access network" may refer to a cellular radio access network or a core network such as EPC. A cellular access network may be exemplified by, but not limited to a 3GPP access network such as GERAN, UTRAN, E-UTRAN, or a 3GPP2 access network such as CDMA1x, HRPD. WLAN access network may be exemplified by, but not limited to a WLAN access network according to 802.11 series, or Hotspot 2.0.

A UE may determine that a cellular access network is overloaded or congested based on a congestion control by the network. For example, a cellular access network node (e.g., MME, SGSN) may issue a Mobility Management (MM) back-off timer or a Session Management (SM) back-off timer to a UE, then the UE is not allowed to transmit MM messages or SM messages to the cellular access network for a given time period.

According to a congestion control based on a MM back-off timer, a MME receives an Attach Request message, a Tracking Area Update Request message, or a (Extended) Service Request message from a UE, the MME may respond with an Attach Reject message, a Tracking Area Update Reject message, or a Service Reject message including information on the MM back-off timer (e.g., T3346). A UE receiving the Attach Reject message, the Tracking Area Update Reject message, or the Service Reject message with the information on the MM back-off timer, may not perform an Attach procedure, a Tracking Area Update procedure, or a Service Request procedure until the MM back-off timer expires.

An example of MM back-off timer, T3346, that may be included in a Tracking Area Update (TAU) Reject message is defined in 3GPP TS 24.301 (see Table 8.2.28.1). The MME may include an information element (IE) "T3346 value" when the general NAS level mobility management congestion control is active. Generally, an operator may set a value of the back-off timer. For example, the MM back-off timer may be set with a value from dozens of minutes to hours based on network situation and operator's policies, and so on.

According to a congestion control based on a SM back-off timer, a MME receives a PDN Connectivity Request message, a Bearer Resource Allocation Request message, or a Bearer Resource Modification Request message from a UE, the MME may respond with a PDN Connectivity Reject message, a Bearer Resource Allocation Reject message, or a Bearer Resource Modification Reject message including information on the SM back-off timer (e.g., T3396) or may include the SM back-off timer (e.g., T3396) within a Deactivate EPS Bearer Context Request message transmitted from the MME to the UE. A UE receiving the PDN Connectivity Reject message, the Bearer Resource Allocation Reject message, the Bearer Resource Modification Reject message, or the Deactivate EPS Bearer Context Request message with the information on the SM back-off timer, may not perform session management related procedures until the SM back-off timer expires.

An example of SM back-off timer, T3396, that may be included in a PDN Connectivity Reject message is defined in 3GPP TS 24.301 (see Table 8.3.19.1). The network may include an IE "T3396 value" if the ESM (EPS Session Management) cause is #26 "insufficient resources" or #27 "missing or unknown APN". Generally, an operator may set a value of the back-off timer. For example, the MM back-off timer may be set with a value from dozens of minutes to hours (up to 72 hours) based on network situation and operator's policies, and so on.

WLAN Network Selection Scheme

A dual mode terminal may support accessibility to both of a cellular access network and a WLAN. The term "dual mode terminal" may refer to a terminal having a capability of routing traffic (e.g. IP traffic) simultaneously to a cellular access network and to a WLAN access network, or a terminal having a capability of routing traffic either to a cellular access network or to a WLAN access network.

Standardization of WLAN Network Selection for 3GPP Terminals (WLAN_NS) are developing as a work item of 3GPP Release-12. WLAN_NS studies solutions for enhanced WLAN network selection for a dual mode terminal supporting a cellular access network and a WLAN access network (e.g., Hotspot 2.0).

In brief, TR 23.865 v0.3.0 describes enhancements to solutions for WLAN network selection. The solutions are based on architectures as specified in TS 23.402 and will take into account Hotspot 2.0 specifications developed by the Wi-Fi Alliance (WFA). 3GPP operator's policies for WLAN network selection will be provisioned on 3GPP terminals via pre-configuration or using the ANDSF server for their delivery. The scope of the technical report will be as follows:

1. Evaluate existing 3GPP WLAN PLMN and access network selection procedures for 3GPP terminals which use Hotspot 2.0 procedures and provisioned network operator policy (e.g. mechanisms based on WLAN and ANDSF) for any needed changes to current specifications. This may require enhancements to the ANDSF framework. The established 3GPP PLMN network selection (per TS 23.122) shall not be impacted. The work must ensure there are no conflicts between existing 3GPP PLMN network selection and the 3GPP WLAN PLMN access network selection procedures defined by this Work Item Description.

2. Ensure that the content in the MO (Management Object) related to 3GPP operator policy provisioning for LAN network selection procedures and the operator policy provisioning in WFA MO for WLAN network selection are consistent.

3. Identify solutions to resolve potential conflicts between policies provided by non-3GPP providers via Hotspot 2.0 mechanisms and policies provided by 3GPP operators using ANDSF.

This work applies to non-seamless WLAN offload as well as to trusted and untrusted WLAN access to EPC with/without seamless offload. It will be investigated whether changes to 3GPP specifications are needed and if so which ones.

WLAN_NS studies several Key issues, and one of the Key issues is using WLAN load information for network selection.

Currently the ANDSF does not provide any network selection policies to the UE that take load or congestion indication from WLAN networks into account. Providing such policies can improve the existing WLAN network selection decisions.

As part of WFA Hotspot 2.0 specifications, an AP compliant with Hotspot 2.0 broadcasts the Basic Service Set (BSS) Load information and supports the Wide Area Network (WAN) Metrics Access Network Query Protocol (ANQP) Element. The BSS Load information element contains information on the current mobile device population and channel utilization in the BSS. The WAN Metrics ANQP element provides information about the WAN link of a WLAN access network The WFA Hotspot 2.0 specifications take into account the BSS Load and backhaul parameters to specify BSS Load policy to prevent a mobile device from joining a WLAN network that may be overly congested with traffic and/or interference. The dual mode UE shall only use policies as specified by 3GPP specifications (e.g. ANDSF MO, I-WLAN Interworking MO) for WLAN network selection. It should be investigated if the policies specified by 3GPP specifications for WLAN network selection may be enhanced to take these parameters into account and align with WFA Hotspot 2.0 specifications.

Required Functionality for using WLAN load information for network selection is to define if and how the 3GPP specifications may use the combination of WLAN BSS load, backhaul network speed, and load information as described by WFA Hotspot 2.0 specifications to specify WLAN selection policies.

Conventionally, ANDSF provides access network selection mechanism without taking account in load or congestion information of an access network. Recently, solutions for using WLAN load information for network selection are proposed. Some of the contributions for standardization referenced by S2-123509, S2-123721 and S2-124266 are briefly discussed below.

S2-123509

This solution proposes to extend the ANDSF selection policies to support also selection policies based on the BSS Load which is supported by Hotspot 2.0 compliant WLAN networks. The solution proposes to exchange information between ANDSF and Advertisement Server (ANQP Server) which is defined in IEEE 802.11u.

When dual mode UE provides its 3GPP Location and/or its geospatial location:

1) The ANDSF queries the nearby hotspot 2.0 access networks, then ANDSF sends BSS load query to the Advertisement Server (ANQP Server), the query includes information of the nearby hotspot 2.0 access network.

2) The Advertisement Server (ANQP Server) sends BSS load query to each AP accordingly, and set timer to wait for BSS load response.

3) Each AP reports its BSS Load to the Advertisement Server (ANQP Server). Once Advertisement Server (ANQP Server) collects all of the BSS Load of each access network, it will stop the timer and send BSS load response to ANDSF.

4) ANDSF will sort the access network according to their BSS Load, the BSS load heavier, the access network priority lower. The ANDSF may send policies to UE based on the BSS Load.

5) The Hotspot 2.0 compliant UE uses the BSS Load as an alternative way to identify and prioritize the discovered WLAN access networks. The UE should prioritize the AP whose load is low for the WLAN selection.

S2-123721

As part of WFA Hotspot 2.0 specifications, an AP compliant with Hotspot 2.0 broadcasts the BSS Load information and supports the WAN Metrics ANQP Element. The BSS Load information element contains information on the current mobile device population and channel utilization in the BSS. As specified in IEEE 802.11-2011, the BSS Load element specifies the following The total number of STAs associated with the BSS.

The percentage of time the AP sensed that the medium was busy.

The remaining amount of medium time available via explicit admission control

The WAN Metrics ANQP element provides information about the WAN link connecting an IEEE 802.11 access network and the internet. This includes the following The downlink speed of WAN backhaul link in kbits/sec The uplink speed of WAN backhaul link in kbits/sec The downlink load which is the percentage loading of the downlink WAN connection measured over a certain interval The uplink load which is the percentage loading of the uplink WAN connection measured over a certain interval New policies for Network Selection, ISMP and ISRP types can be enabled that utilize this information about WLAN network load. For example Prefer APs of WLAN network(s) from amongst the available WLAN networks that have total number of STAs associated with AP less than a certain threshold for past×time duration Prefer WLAN "A" over current cellular network if the WLAN medium was busy for duration less than say 50% and the downlink WAN connection was loaded less than say 50% for past×time duration Move IP flow "XYZ" from current cellular network to current WLAN network if current WLAN has remaining amount of medium time available via admission control greater than 500 units for past×time duration The information from BSS Load broadcast can also be averaged over a period by the UE to provide more useful input into the decision process when these policies are enforced.

S2-124266

It is proposed to extend ANDSF selection policies to support selection policies based on the BSS Load information which is supported by Hotspot 2.0 compliant WLAN networks. The ANDSF may send policies to UE based on WLAN load information to indicate for example that "WLANs whose load level is below the threshold value X have the access priority Y." The UE uses the WLAN load level to determine whether the discovered WLAN access networks can be used without a severe degradation in user experience or not. A Hotspot 2.0 compliant UE is capable of obtaining the load status of a specific WLAN prior to association to WLAN by using applicable discovery procedures (e.g. based on the ANQP protocol) and/or by receiving the beacon transmissions of APs.

Enhanced Access Network Selection Scheme

Currently proposed schemes for WLAN network selection provides criteria or mechanisms for selecting a WLAN based on load status or congestion information among accessible WLAN access networks, but do not specifically define how a terminal select an access network in case when all of the accessible WLANs are overloaded or congested.

Further, currently proposed schemes do not specifically define how a terminal select an access network in case when all of the accessible WLANs are overloaded or congested and at the same time the cellular access network is also overloaded or congested.

According to currently proposed schemes for WLAN network selection, a terminal cannot select any WLAN because all of the accessible WLANs are overloaded or congested and the terminal is not allowed to access a cellular access network because the cellular access network is also overloaded or congested. Therefore, a terminal cannot receive or transmit any traffic since no access is allowed to any of access networks, thus a user experience may be severely degraded.

The present invention proposes new and enhanced schemes for a dual mode terminal supporting accessibility to both of a cellular access network and a WLAN to efficiently select an access network based on load status and/or congestion information of access networks.

Embodiment 1

One embodiment of the present invention proposes a solution for access network selection, when WLAN access networks have higher priority (or preferred) than cellular access networks, and when all of the accessible WLAN access networks are determined (or considered) to be overloaded or congested. Here, the accessible WLAN may include a WLAN that a UE can associate with or a WLAN that is available to a UE.

Access network selection according to this embodiment may be performed in one or more of the following situations. However, the following situations are for exemplification but not limited thereto.

One assumable situation is that a UE performs an access network selection mechanism configured to the UE (or according to a configuration obtained from ANDSF) in order to initiate PDN connection(s) to a specific APN or a connection to a specific IP flow(s), when a WLAN access network has higher priority than or preferred to a cellular access network.

Another assumable situation is that a UE moves PDN connection(s) to a specific APN(s) to another access network, or a connection to a specific IP flow(s) to another access network based on an access network selection mechanism configured to the UE (or according to a configuration obtained from ANDSF), when a WLAN access network has higher priority than or preferred to a cellular access network.

In the above such situation(s), it is assumed that a specific case when all of the accessible WLAN access networks are overloaded or congested. In such case, it is to be determined that whether a UE selects a WLAN for the APN(s) (or PDN connection(s) or IP flows(s)) even though all of the accessible WLAN access networks are overloaded or congested, or selects a cellular access network instead of the WLAN. The proposed embodiment further includes selecting or determining a specific WLAN access network among a plurality of accessible WLANs. The proposed embodiment further includes selecting or determining a specific cellular access network among a plurality of accessible cellular access networks. Here, the accessible cellular access network may include a cellular access network that a UE can camp on/connect to/register with or a cellular access network that is available to a UE.

The determining (i.e., determining a cellular access network or a WLAN access network, or determining a specific WLAN among a plurality of WLANs, or determining a specific cellular access network among a plurality of accessible cellular access networks) may be performed by at least one of a network node or a UE. The network node may include ANDSF, PCRF, serving node (e.g., MME, SGSN), P-GW, Gateway GPRS Support Node (GGSN), AAA (Authentication, Authorization and Accounting) server, TWAN (Trusted WLAN Access Network), eNodeB, WLAN AP (Access Point), or ANQP server.

A network node may perform access network determination/selection based on load status and/or congestion information of the WLANs which are accessible by the UE. The network node transmits information on the determination/selection result to the UE. In case of ANDSF, the information on the determination/selection result may be in format of policy information. The UE may select a WLAN or cellular access network based on the received information. The received information may include information access network type or access network technology, or information on a specific access network. If the received information includes access network type or access network technology, then the UE is allowed to select a specific access network which falls within the access network type or access network technology. For example, the UE may select a specific Service Set Identifier (SSID) when the received information indicates that the access network type or the access network technology is WLAN.

A UE may perform access network determination/selection based on load status and/or congestion information of the WLANs which are accessible by the UE. The load status and/or congestion information of the WLANs may be obtained by the UE from the network node (e.g., ANDSF, PCRF, serving node (e.g., MME, SGSN), P-GW/GGSN, AAA (Authentication, Authorization and Accounting) server, TWAN (Trusted WLAN Access Network), eNodeB, WLAN AP (Access Point), or ANQP server).

The above described access network determination/selection may be performed based on at least one of the following information and/or criteria. The above described access network determination/selection may be performed based on a combination of the load status and/or congestion information of the WLANs and at least one of the following information and/or criteria. However, the following information and/or criteria are for exemplification but not limited thereto.

Load status and/or congestion information of a cellular access network to which a UE currently connected and/or is accessible.

According to one example, a cellular access network may be selected if the load status and/or congestion information of a cellular access network indicates that the cellular access network to which a UE currently connected is considered not to be overloaded/congested, even though a WLAN is preferred but all of accessible WLANs are overloaded/congested.

According to another example, a WLAN access network may be selected if the load status and/or congestion information of a cellular access network indicates that the cellular access network to which a UE currently connected is considered to be overloaded/congested, even though all of accessible WLANs are overloaded/congested but a WLAN is preferred.

According to yet another example, a cellular access network may be selected if the load status and/or congestion information of a cellular access network indicates that the cellular access network to which a UE currently connected is considered to be overloaded/congested, even though a WLAN is preferred but all of accessible WLANs are overloaded/congested. The determined/selected cellular access network may be a cellular access network of a different PLMN where the UE can be served. For example, a first cellular access network belonging to a first PLMN is considered to be overloaded/congested, a second cellular access network belonging to a second PLMN may be selected if the second cellular access network is considered not be overloaded/congested.

Information obtained from ANDSF and/or configured to a UE

According to one example, information obtained from ANDSF and/or configured to a UE may indicate that, when all of accessible WLANs are overloaded/congested, the UE selects a WLAN at any rate (i.e., the UE shall select a WLAN), or the UE is recommended to select a WLAN (i.e., the UE should select a WLAN), or the UE is allowed to select a WLAN by its own determination (i.e., the UE may select a WLAN).

According to another example, a cellular access network may be selected when all of accessible WLANs are overloaded/congested, even though WLAN access network is preferred based on pre-configured preference configuration at the UE.

Subscription information

According to one example, a cellular access network may be selected if the subscription information indicates that the subscriber class is higher than a predetermined threshold, even though a WLAN is preferred but all of accessible WLANs are overloaded/congested.

According to another example, a WLAN access network may be selected if the subscription information indicates that the subscriber class is lower than a predetermined threshold, even though all of accessible WLANs are overloaded/congested but a WLAN is preferred.

APN related information or PDN related information

According to one example, a WLAN access network may be selected if the APN related information indicates that the APN is for Internet, even though all of accessible WLANs are overloaded/congested but a WLAN is preferred.

According to another example, a cellular access network may be selected if the APN related information indicates an IMS APN, even though a WLAN is preferred but all of accessible WLANs are overloaded/congested.

Information on whether to apply/use MAPCON (Multi Access PDN Connectivity)

IP flow related information, service related information, and/or bearer related information IP flow related information, service related information, and/or bearer related information may include, for example, application related information, source IP address information, destination IP address information, Protocol Type information, source port information, destination port information, QoS information, domain related information, type of bearer, information of whether to apply/use Non-Seamless WLAN Offload (NSWO), information of whether to apply/use IFOM (IP Flow Mobility), and so on.

According to one example, a WLAN access network may be selected if the IP flow related information, service related information, and/or bearer related information indicates that a WLAN access network is preferred to a cellular access network for a specific IP flow(s), service(s), or bearer(s) and a WLAN access network should be used by using NSWO, even though all of accessible WLANs are overloaded/congested.

WLAN related information

WLAN related information may include, for example, signal strength, frequency band, access network type (e.g., private, public, free, personal, emergency, etc.), venue information, Realms information, Organizational Unique Identifiers (OUIs) information, and so on.

WLAN related information may further include all information provided by Hotspot 2.0 compliant WLAN network.

According to one example, when a UE is to select a WLAN access network, WLAN related information may be used for the UE to select a WLAN having a lowest load/congestion among the accessible WLANs.

Operator policy, user preference, and/or local policy

According to one example, a cellular access network may be selected if all of accessible WLANs are overloaded/congested, even though the operator policy, user preference, and/or local policy indicates that WLAN is preferred.

Overload and/or congestion status information of a core network

Information on a roaming/non-roaming status of a UE

Capability information of a UE

Information related to current time

Current location, space, or location-related information

Other information used for access network selection

Other information used for access network selection is defined in technical specifications such as 3GPP TS 24.312, 3GPP TS 24.234.

History information on overload/congestion/load of WLAN access network

The history information overload/congestion/load of WLAN access network may be stored by a UE and/or a network node for a predetermined time period or a predetermined number of items. The history information may include information of WLAN access networks that the UE once associated, or any WLAN access networks.

According to one example, using the history information, a UE may not consider an association or a re-association to a WLAN once was overloaded/congested for a predetermined time period (e.g., setting a timer).

History information on overload/congestion/load of cellular access network

The history information overload/congestion/load of cellular access network may be stored by a UE and/or a network node for a predetermined time period or a predetermined number of items. The history information may include information of cellular access networks that the UE once registered/accessed, or any cellular access networks.

According to one example, using the history information, a UE may not consider register/access or re-register/re-access to a cellular access network once was overloaded/congested for a predetermined time period (e.g., setting a timer, or based on a timer provided by a network (e.g., MM back-off timer, SM back-off timer)).

Embodiment 2

Another embodiment of the present invention proposes a solution for access network selection, when a UE already is associated (or connected) with a WLAN access network, and when the WLAN access network with which the UE is associated is determined (or considered) to be overloaded or congested.

It is to be determined, when the WLAN access network with which the UE is associated is overloaded/congested, whether to maintain the association to the WLAN access network (e.g., maintain receiving services provided by currently associated WLAN access network), or select another WLAN access network or a cellular access network (e.g., move PDN connection(s) or IP flow(s) connected via currently associated WLAN access network to another WLAN access network or a cellular access network). The proposed embodiment further includes selecting or determining a specific WLAN access network among a plurality of accessible WLANs. The proposed embodiment further includes selecting or determining a specific cellular access network among a plurality of accessible cellular access networks.

The determining (i.e., determining/selecting the currently associated WLAN access network, a cellular access network or another WLAN access network, or determining a specific WLAN among a plurality of WLANs, or determining a specific cellular access network among a plurality of accessible cellular access networks) may be performed by at least one of a network node or a UE. The network node may include ANDSF, PCRF, serving node (e.g., MME, SGSN), P-GW/GGSN, AAA (Authentication, Authorization and Accounting) server, TWAN (Trusted WLAN Access Network), eNodeB, WLAN AP (Access Point), or ANQP server.

A network node may perform access network determination/selection based on load status and/or congestion information of the WLAN with which the UE is currently associated. The network node transmits information on the determination/selection result to the UE. In case of ANDSF, the information on the determination/selection result may be in format of policy information. The UE may stay in the WLAN with which the UE is currently associated, or select a WLAN or cellular access network based on the received information. The received information may include information access network type or access network technology, or information on a specific access network. If the received information includes access network type or access network technology, then the UE is allowed to select a specific access network which falls within the access network type or access network technology. For example, the UE may select a specific Service Set Identifier (SSID) when the received information indicates that the access network type or the access network technology is WLAN.

A UE may perform access network determination/selection based on load status and/or congestion information of the WLAN with which the UE is currently associated. The load status and/or congestion information of the WLAN may be obtained by the UE from the network node (e.g., ANDSF, PCRF, serving node (e.g., MME, SGSN), P-GW/GGSN, AAA (Authentication, Authorization and Accounting) server, TWAN (Trusted WLAN Access Network), eNodeB, WLAN AP (Access Point), or ANQP server).

The above described access network determination/selection may be performed based on at least one of the following information and/or criteria. The above described access network determination/selection may be performed based on a combination of the load status and/or congestion information of the WLAN with which the UE is currently associated and at least one of the following information and/or criteria. However, the following information and/or criteria are for exemplification but not limited thereto.

Information on priority or preference for WLAN access networks

According to one example, the currently associated WLAN access network or other accessible WLAN access networks are to be preferentially considered, if the information on priority or preference for WLAN access networks indicates that WLAN access networks is preferred to cellular access networks.

Load status and/or congestion information of other accessible WLAN access networks According to one example, a cellular access network may be selected if the load status and/or congestion information of other accessible WLAN access networks indicates that all of other accessible WLAN access networks are overloaded/congested, even though a WLAN is preferred but all of the currently associated WLAN access network and other accessible WLANs are overloaded/congested.

According to another example, in case when a WLAN is to be selected, a WLAN having a lowest load/congestion may be selected among the currently associated WLAN access network and other accessible WLANs.

Load status and/or congestion information of accessible cellular access networks According to one example, a cellular access network may be selected if the load status and/or congestion information of a cellular access network indicates that accessible cellular access networks are considered not to be overloaded/congested, even though a WLAN is preferred but the currently associated WLAN access network is overloaded/congested.

According to another example, the currently associated WLAN access network may be selected if the load status and/or congestion information of a cellular access network indicates that accessible cellular access networks are considered to be overloaded/congested, even though but the currently associated WLAN access network is overloaded/congested but a WLAN is preferred.

According to yet another example, a cellular access network may be selected if the load status and/or congestion information of a cellular access network indicates that accessible cellular access networks are considered to be overloaded/congested, even though a WLAN is preferred but all of accessible WLANs are overloaded/congested. The determined/selected cellular access network may be a cellular access network of a different PLMN where the overloaded/congested accessible cellular access networks belong to. For example, a first cellular access network belonging to a first PLMN is considered to be overloaded/congested, a second cellular access network belonging to a second PLMN may be selected if the second cellular access network is considered not be overloaded/congested.

Information obtained from ANDSF and/or configured to a UE

According to one example, information obtained from ANDSF and/or configured to a UE may indicate that, when the currently associated WLAN is overloaded/congested, the UE stay at the currently associated WLAN at any rate (i.e., the UE shall stay), or the UE is recommended to stay at the currently associated WLAN (i.e., the UE should stay), or the UE is allowed to stay at the currently associated WLAN by its own determination (i.e., the UE may stay).

According to another example, a cellular access network may be selected when the currently associated WLAN is overloaded/congested, even though WLAN access network is preferred based on pre-configured preference configuration at the UE.

According to yet another example, a cellular access network may be selected when all of the currently associated WLAN and other accessible WLAN access networks are overloaded/congested, even though WLAN access network is preferred based on pre-configured preference configuration at the UE.

According to yet another example, one of other accessible WLAN access networks may be selected when the currently associated WLAN access network is overloaded/congested, if a WLAN access network is preferred based on pre-configured preference configuration at the UE.

Subscription information

According to one example, a cellular access network may be selected if the subscription information indicates that the subscriber class is higher than a predetermined threshold, even though a WLAN is preferred but the currently associated WLAN access network is overloaded/congested.

According to another example, a WLAN access network may be selected if the subscription information indicates that the subscriber class is lower than a predetermined threshold, even though the currently associated WLAN access network is overloaded/congested but a WLAN is preferred. In this case, the currently associated WLAN access network may be selected or one of other accessible WLAN access networks may be selected.

According to yet another example, a cellular access network may be selected if the subscription information indicates that the subscriber class is higher than a predetermined threshold, even though a WLAN is preferred but all of the currently associated WLAN access network and other accessible WLAN access networks are overloaded/congested.

According to yet another example, a WLAN access network may be selected if the subscription information indicates that the subscriber class is lower than a predetermined threshold, even though all of the currently associated WLAN access network and other accessible WLAN access networks are overloaded/congested but a WLAN is preferred. In this case, the currently associated WLAN access network may be selected or one of other accessible WLAN access networks may be selected.

APN related information or PDN related information

According to one example, a WLAN access network may be selected if the APN related information indicates that the APN is for Internet, even though the currently associated WLAN access network is overloaded/congested but a WLAN is preferred. In this case, the currently associated WLAN access network may be selected or one of other accessible WLAN access networks may be selected.

According to another example, a cellular access network may be selected if the APN related information indicates an IMS APN, even though a WLAN is preferred but the currently associated WLAN access network is overloaded/congested.

Information on whether to apply/use MAPCON (Multi Access PDN Connectivity)

IP flow related information, service related information, and/or bearer related information IP flow related information, service related information, and/or bearer related information may include, for example, application related information, source IP address information, destination IP address information, Protocol Type information, source port information, destination port information, QoS information, domain related information, type of bearer, information of whether to apply/use Non-Seamless WLAN Offload (NSWO), information of whether to apply/use IFOM (IP Flow Mobility), and so on.

According to one example, a WLAN access network may be selected if the IP flow related information, service related information, and/or bearer related information indicates that a WLAN access network is preferred to a cellular access network for a specific IP flow(s), service(s), or bearer(s) and a WLAN access network should be used by using NSWO, even though all of accessible WLANs are overloaded/congested.

WLAN related information

WLAN related information may include, for example, signal strength, frequency band, access network type (e.g., private, public, free, personal, emergency, etc.), venue information, Realms information, Organizational Unique Identifiers (OUIs) information, and so on.

WLAN related information may further include all information provided by Hotspot 2.0 compliant WLAN network.

Operator policy, user preference, and/or local policy

According to one example, a cellular access network may be selected if the currently associated WLAN access network is overloaded/congested, even though the operator policy, user preference, and/or local policy indicates that WLAN is preferred.

Overload and/or congestion status information of a core network

Information on a roaming/non-roaming status of a UE

Capability information of a UE

Information related to current time

Current location, space, or location-related information

Other information used for access network selection

Other information used for access network selection is defined in technical specifications such as 3GPP TS 24.312, 3GPP TS 24.234.

History information on overload/congestion/load of WLAN access network

The history information overload/congestion/load of WLAN access network may be stored by a UE and/or a network node for a predetermined time period or a predetermined number of items. The history information may include information of WLAN access networks that the UE once associated, or any WLAN access networks.

According to one example, using the history information, a UE may not consider an association or a re-association to a WLAN once was overloaded/congested for a predetermined time period (e.g., setting a timer).

History information on overload/congestion/load of cellular access network

The history information overload/congestion/load of cellular access network may be stored by a UE and/or a network node for a predetermined time period or a predetermined number of items. The history information may include information of cellular access networks that the UE once registered/accessed, or any cellular access networks.

According to one example, using the history information, a UE may not consider register/access or re-register/re-access to a cellular access network once was overloaded/congested for a predetermined time period (e.g., setting a timer, or based on a timer provided by a network (e.g., MM back-off timer, SM back-off timer)).

For example, if a SM back-off timer (e.g., T3396) is running for a UE performed Session Management operation after camping-on a cellular access network of a first PLMN, the cellular access network of the first PLMN is not considered as a selectable access network until the SM back-off timer expires, if the currently associated WLAN access network is determined (or considered) to be overload/congested.

The information and/or criteria described in the Embodiments 1 and 2 of the present invention may be store by a UE and/or a network node, and may be obtained by the UE and/or the network node from the UE, the network node and/or another network node.

In case of selecting or not selecting a cellular access network, only a PLMN to which the cellular access network belongs may be considered, or Equivalent PLMN (EPLMN) may be considered additionally.

An access network selection scheme proposed by the present invention may be referred to as an access technology selection scheme or RAT selection scheme.

One or more information used for determining (or considering) that a cellular access network or WLAN access network is overload/congested is used independently or as a combination thereof. Such information may be information that a UE has, calculates, deduces, or measures, and/or information that the UE obtained from a network explicitly or implicitly. For example, a UE may considers a WLAN as overloaded/congested based on at least one of information explicitly indicating that the WLAN is overloaded/congested, information on total number of STAs associated with the BSS, information on the percentage of time the AP sensed that the medium was busy, information on the remaining amount of medium time available via explicit admission control, information on backhaul network to which the WLAN is connected (e.g., information on transmission rate, load, and/or congestion, etc.), or information on throughput measured by the UE. For example, a UE may considers a cellular access network as overloaded/congested based on at least one of an inference from being unable or being rejected to access to an eNodeB, receiving a reject message in response to an RRC request, receiving Attach reject/TAU reject/RAU reject/Service reject (with receiving a MM back-off timer), receiving PDN connectivity reject/Bearer resource allocation reject/Bearer resource modification reject/Deactivate EPS bearer context request (with a SM back-off timer), information indicating overload/congestion status (or information indicating not overload/congestion status) obtained from a network, or information on throughput measured by the UE.

A network or a network node described in this document may include ANDSF, PCRF, serving node (e.g., MME, SGSN), P-GW/GGSN, AAA (Authentication, Authorization and Accounting) server, TWAN (Trusted WLAN Access Network), eNodeB, WLAN AP (Access Point), or ANQP server. In addition, a network node related to cellular access network may provide a UE with overload/congestion/load information of a WLAN access network, or a network node related to WLAN access network may provide a UE with overload/congestion/load information of a cellular access network.

Overload/congestion/load information of at least one of cellular access network or WLAN access network may be used as a format of a specific value, a threshold, or a range of values. For example, an access network A may be selected if the overload/congestion/load information has a value higher than (or equal to) a specific value, or the access network A may not be selected if the overload/congestion/load information has a value lower than (or equal to) the specific value. For example, an access network A may be selected if the overload/congestion/load information has a value within a specific range of values. The specific value, the threshold, or the range of values may be used as a combination, and a plurality of instances may be used. This also applies to information and/or criteria described in the Embodiments 1 and 2 of the present invention that can be represented as a specific value, a threshold, or a range of values. That is, information and/or criteria described in the Embodiments 1 and 2 of the present invention may be used for access network selection by applying a various format of a specific value, a threshold, or a range of values, if the information is measured, determined, estimated, converted as an amount or a number.

The above described access network selection scheme may be performed as one procedure, or a series of procedures. In the embodiment 2, for example, one of other accessible WLAN access networks is selected for the first time when the currently associated WLAN access network is overloaded/congested, and a UE tries association to the selected WLAN access network. After determining that all of the other accessible WLAN access networks are overloaded/congested, the UE may select a cellular access network.

Furthermore, preferences or priorities of cellular access networks and preferences or priorities of WLAN access network may be configured in a various granularities. For example, the granularity may be defined by of criteria of 3GPP RAT, or WLAN, etc. (see TS 24.312).

Specifically, ISMP (Inter System Mobility Policy) of ANDSF policy may include rules and preferences defined by an operator, and may be used as a basis for determining inter-system mobility. For example, a UE may select most preferred RAT or access network among available candidates for access EPC based on ISMP. ISMP format of ANDSF information may be configured as in the Table 2.

TABLE 2

<X>/Policy
<X>/Policy/<X>
<X>/Policy/<X>/RulePriority
<X>/Policy/<X>/PrioritizedAccess
<X>/Policy/<X>/PrioritizedAccess/<X>
<X>/Policy/<X>/PrioritizedAccess/<X>/ AccessTechnology
<X>/Policy/<X>/PrioritizedAccess/<X>/ AccessId
<X>/Policy/<X>/PrioritizedAccess/<X>/ SecondaryAccessId
<X>/Policy/<X>/PrioritizedAccess/<X>/ AccessNetworkPriority
...

In Table 2, <X> is a placeholder. <X>/Name is a name of ANDSF MO configuration. <X>/Policy/<X> is a placeholder of policies for ISMP. "PrioritizedAccess" is a category indicating a preferred access for specific rule. "AccessTechnology" parameter may be set a value indicating one of 3GPP, WLAN, WiMAX, etc. Thus, "<X>/Policy/<X>/PrioritizedAccess/<X>/AccessTechnology" is defined as a AccessTechnology leaf that indicates a prioritized access technology. Possible values for the AccessTechnology leaf is shown in Table 3.

TABLE 3

| Value | Description |
| --- | --- |
| 0 | Reserved |
| 1 | 3GPP |
| 2 | Reserved |
| 3 | WLAN |
| 4 | WiMAX |
| 5-255 | Reserved |

According to another example, smaller granularities of 3GPP RAT (e.g., GERAN, UTRAN, or E-UTRAN) may be used (see section 6.1 of 3GPP TR 23.890 v0.3.0). Similarly, smaller granularities of WLAN (e.g., Hotspot 2.0, other than Hotspot 2.0) may be used.

Preferences or priorities of cellular access networks and preferences or priorities of WLAN access network configured in a various granularities described above can be applied to other policies of ANDSF (e.g., ISRP).

Figure 8:
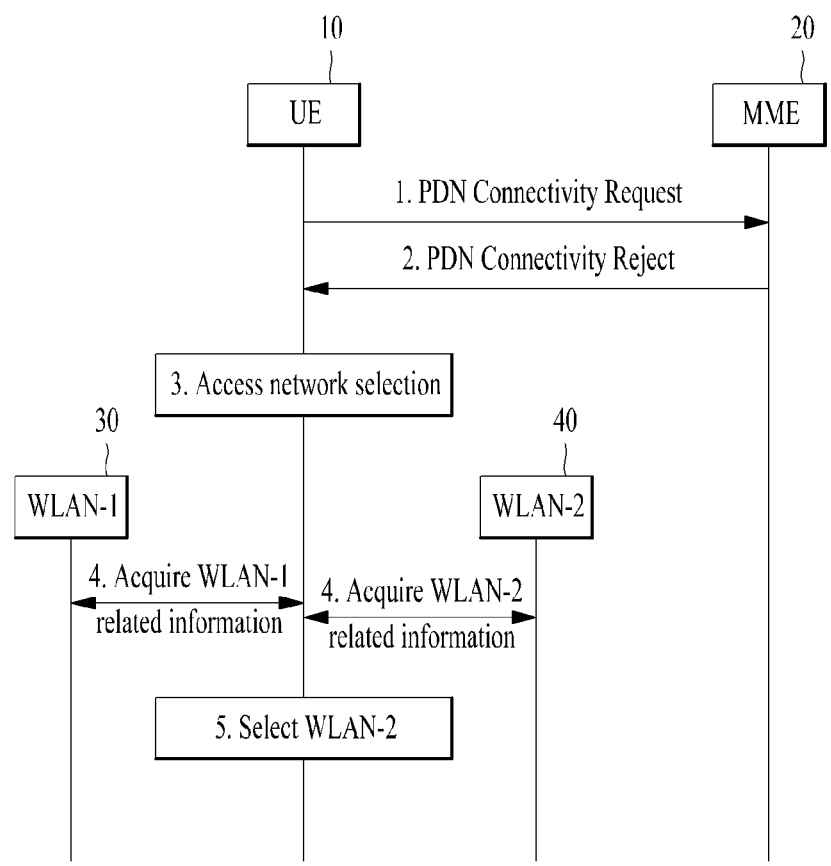
FIG. 8 is a flow diagram illustrating an exemplary method for access network selection according to the present invention.

FIG. 8 is a flow diagram illustrating an exemplary method for access network selection according to the present invention.

In the example of FIG. 8, it is assumed that UE 10 may be pre-configured with a policy or a rule for access network discovery and selection, or UE 10 may obtain and store the policy/rule for access network discovery and selection from a network node (e.g., ANDSF).

In step 1, UE 10 transmits, to MME 20, PDN Connectivity Request message including a specific APN in order to seek services for the specific APN (e.g., APN#1).

Receiving the PDN Connectivity Request message, MME 20 activates a SM congestion control for the specific APN included in the PDN Connectivity Request message. The SM congestion control is activated due to at least one of a congestion status in MME 20, OAM operation by MME 20, restart or recovery of a PDN GW that serves the specific APN, and so on.

In step 2, MME 20 transmits, to UE 10, a PDN Connectivity Reject message including SM back-off timer information since MME 20 is performing the SM congestion control. UE 10 receiving the SM back-off timer information is not allowed to transmit SM procedure related message to the cellular access network during the SM back-off timer is running.

In step 3, UE 10 performs access network selection based on information (e.g., policy/rule) related to the access network discovery and selection. UE 10 may determine that a WLAN access network has higher priority than a cellular access network for a PDN connection for the specific APN (APN#1). Location information and/or time information related UE 10 may be an additional basis of the determination/selection. For example, it was determined that a cellular access network had a higher priority than a WLAN access network for a PDN connection for APN#1 at location A, as the UE 10 moves its location from the location A to location B, it may be determined that the WLAN access network has a higher priority than the cellular access network for the PDN connection for APN#1 at the location B. Additionally or alternatively, it may be determined that the WLAN access network has a higher priority than the cellular access network for the PDN connection for APN#1 after a predetermined time point, while the cellular access network had a higher priority than the WLAN access network for the PDN connection for APN#1.

Further, in the example of FIG. 8, it is assumed that WLAN-1 30 and WLAN-2 40 are all overloaded/congested. According to conventional WLAN access network selection scheme, when all of accessible WLAN access networks are overloaded/congested and also a MM/SM back-off timer is running in a cellular access network, ambiguity occurs whether to select one of the accessible WLAN access networks or to select the cellular access network, thus a waste of network resources or a malfunction of a UE or a network node may be expected. Moreover, the conventional WLAN access network selection scheme does not define a possibility to select one of the accessible WLAN access networks when all of accessible WLAN access networks are overloaded/congested. Thus, according to the conventional WLAN access network selection scheme, a cellular access network may be selected. However, a MM/SM back-off timer is running in a cellular access network as described in the Step 1, and a UE shall wait and cannot initiate MM procedure or SM procedure to the network. Therefore, a UE cannot receive or transmit any traffic since no access network is available.

To solve such a problem, according to one example but not a limitation of an embodiment of the present invention, a WLAN access network may be selected if the load status and/or congestion information of a cellular access network indicates that the cellular access network to which a UE currently connected is considered to be overloaded/congested (e.g., SM/MM back-off timer is running), even though all of accessible WLANs are overloaded/congested but a WLAN is preferred.

Specifically, in step 4, UE 10 may acquire accessible WLAN access network related information, For example, UE 10 may acquire WLAN-1 related information and WLAN-2 related information. WLAN related information may include various information such as SSID related information, realm information, BSS load information, backhaul load information. UE 10 may acquire WLAN related information from beacon message from a WLAN AP and/or using a query protocol (e.g., ANQP query).

UE 10 may determine whether each of WLAN access networks is an available access network or not, based on information (e.g., policy/rule) related to the access network discovery and selection. As assumed above, all of WLAN-1 30 and WLAN-2 40 are overloaded/congested and do not meet requirements for load status defined by information (e.g., policy/rule) related to the access network discovery and selection. Thus all of WLAN-1 30 and WLAN-2 40 are determined (or considered) as non-available access networks.

For example, information (e.g., policy/rule) related to the access network discovery and selection defines that MaximumBSSLoad=60 (i.e., BSS load up to 60 is allowable), MinimumBackhaulThreshold=2 Mbps in the downlink (i.e., backhaul rate under 2 Mbps in downlink is not allowed). If the acquired WLAN-1 related information indicates that BSS load is 80 and downlink backhaul rate is 1.5 Mbps, WLAN-1 30 is determined as non-available access network. In addition, if the acquired WLAN-2 related information indicates that BSS load is 65 and downlink backhaul rate is 1.8 Mbps, WLAN-2 40 is determined as non-available access network.

As described above, all of the accessible WLAN access networks (i.e., WLAN-1 30 and WLAN-2 40) are determined/considered as non-available. However, UE 10 is allowed to select one of the accessible WLANs, if a service for the APN#1 is impossible using the cellular access network due to the back-off timer.

Thus, UE 10 may select WLAN-2 40 since WLAN-2 40 has less overloaded/congested than WLAN-1 30. UE 10 may select a proper WLAN among the accessible WLANs based on various criteria (e.g., signal strength, realm information, service provider information, trusted WLAN or non-trusted WLAN).

UE 10 may perform operations of associating/accessing to WLAN-2 40, in order to create a PDN connection for the APN#1.

The exemplary method of FIG. 8 is described as a series of steps for clarity, but it is not a limitation of order of the steps and all or some of the steps may be performed simultaneously or in a different order. Further, not all of the steps described in the figures are necessary for implementing a scheme proposed by the present invention.

According to the embodiments of the present invention, efficient usage of network resources and enhanced user experiences are provided.

The above-described embodiments of the present invention may be independently applied or two or more of the above-described embodiments may be simultaneously applied.

Figure 9:
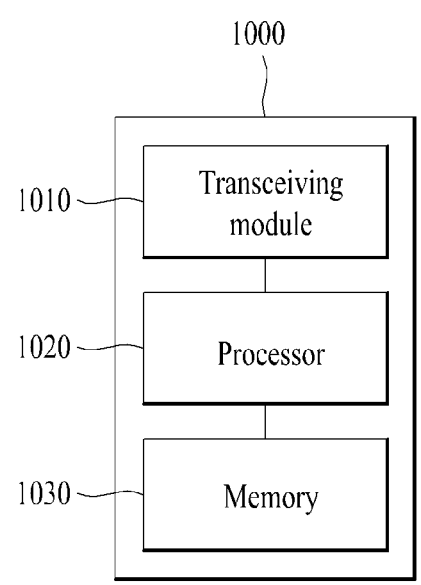
FIG. 9 is a diagram showing the configuration of an apparatus according to an exemplary embodiment of the present invention.

FIG. 9 is a diagram showing the configuration of an apparatus according to an exemplary embodiment of the present invention.

Referring to FIG. 9, the apparatus 1000 according to the present invention may include a transceiving module 1010, a processor 1020 and a memory 1030. The transceiving module 1010 may be configured to transmit various signals, data and information to an external device (e.g., a network node, UE, a server, etc.) and receive various signals, data and information from an external device (e.g., a network node, UE, a server, etc.). The processor 1020 may control overall operation of the apparatus 1000 and the apparatus 1000 may be configured to perform a function for processing information transmitted or received to or from an external device. The memory 1030 may store the processed information for a predetermined time and may be replaced by a buffer (not shown).

The apparatus 1000 may be implemented as a UE described in the present document. The processor 1020 may be configured to determine whether at least one cellular access network is overloaded. The processor 1020 may be further configured to determine whether at least one wireless local area network (WLAN) access network is overloaded. The processor 1020 may be further configured to determine priorities for the at least one cellular access network and at least one WLAN access network. The processor 1020 may be further configured to select one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded.

The apparatus 1000 may be implemented as a network node described in the present document. The processor 1020 may be configured to determine whether at least one cellular access network is overloaded. The processor 1020 may be further configured to determine whether at least one wireless local area network (WLAN) access network is overloaded. The processor 1020 may be further configured to determine priorities for the at least one cellular access network and at least one WLAN access network. The processor 1020 may be further configured to select one access network among the at least one WLAN access network based on information for access network selection, if the at least one WLAN access network is determined to have a higher priority than the at least one cellular access network, and if each the at least one cellular access network is determined to be overloaded and each of the at least one WLAN access network is determined to be overloaded. The processor 1020 may be further configured to transmit, using the transceiving module, information on the selected WLAN access network to the UE.

The embodiments of the present invention may be independently or simultaneously applied to the detailed configuration of the UE 1000 and a description thereof will be omitted for clarity.

The embodiments of the present invention may be implemented by a variety of means, for example, hardware, firmware, software, or a combination thereof.

In the case of implementing the present invention by hardware, the present invention may be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention may be implemented in the form of a variety of formats, for example, modules, procedures, functions, etc. Software code may be stored in a memory unit so that it may be driven by a processor. The memory unit is located inside or outside of the processor, so that it may communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations may be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

The embodiments of the present invention are applicable to various mobile communication systems.

What is claimed is:

1. A method for selecting an access network by a user equipment (UE), the method comprising:

determining whether at least one cellular access network of a first PLMN (public land mobile network) is overloaded;

determining whether at least one wireless local area network (WLAN) access network is overloaded; and selecting one access network having a lowest load or congestion among the at least one WLAN access network based on information for an access network selection, when an ANDSF (Access Network Discovery and Selection Function) indicates that the UE unconditionally stays at a currently associated WLAN and the UE is connected to one of the at least one cellular access network, when all of the at least one cellular access network are determined to be overloaded or have been restricted for access to a predetermined time period, and when all of the at least one WLAN access network are determined to be overloaded or have been restricted for access to the predetermined time period, wherein the at least one cellular access network of the first PLMN is determined to be overloaded if a back-off timer for the predetermined time period is running for the at least one cellular access network, and wherein the predetermined time period is set by using history information, which is stored by the UE, and is related to at least one of an overload, congestion or load;

selecting one access network among at least one cellular access network of a second PLMN when an ANDSF indicates that the UE conditionally stays at the currently associated WLAN, if all of the at least one WLAN access network are overloaded or have been restricted for access to the predetermined time period, wherein the second PLMN is one of an EPLMN (equivalent PLMN) or a PLMN which consists of only cellular access networks; and transmitting information using the selected one access network.

2. The method according to claim 1, wherein the at least one WLAN access network is determined to be overloaded if a value of a load related parameter of the at least one WLAN access network is higher than a predetermined threshold.

3. The method according to claim 2, wherein the load related parameter includes at least one of:

information explicitly indicating that the at least one WLAN is overloaded, information on a total number of stations associated with at least one BSS of the at least one WLAN access network, information on a percentage of time that at least one access point (AP) of the at least one WLAN access network sensed that the medium was busy, information on a remaining amount of medium time available via an explicit admission control, information on a backhaul network to which the at least one WLAN is connected, or information on a throughput measured by the UE.

4. The method according to claim 1, wherein information on the back-off timer is provided by a network node.

5. The method according to claim 1, wherein the information for access network selection includes at least one of:

information on a priority or preference for the at least one WLAN access network, load status or congestion information of at least one WLAN access network, load status or congestion information of at least one cellular access network, policy or rule information for an access network discovery and selection, subscription information, PDN connection information, information on whether to apply Multi Access PDN Connectivity (MAPCON), IP flow information, service information, bearer information, operator policy information, user preference information, local policy information, load status information of a core network, information on a roaming/non-roaming status of the UE, capability of the UE, time information, location information, history information on a load status of the at least one WLAN access network, or history information on load information of the at least one cellular access network.

6. A user equipment (UE) for selecting an access network, the UE comprising:

a transceiving module; and a processor, wherein the processor is configured to:

determine whether at least one cellular access network of a first PLMN (public land mobile network) is overloaded, determine whether at least one wireless local area network (WLAN) access network is overloaded, and select one access network having a lowest load or congestion among the at least one WLAN access network based on information for an access network selection, when an ANDSF (Access Network Discovery and Selection Function) indicates that the UE unconditionally stays at a currently associated WLAN and the UE is connected to one of the at least one cellular access network, when all of the at least one cellular access network are determined to be overloaded or have been restricted for access to a predetermined time period, and when all of the at least one WLAN access network are determined to be overloaded or have been restricted for access to the predetermined time period, wherein the at least one cellular access network of the first PLMN is determined to be overloaded if a back-off timer for the predetermined time period is running for the at least one cellular access network, and wherein the predetermined time period is set by using history information, which is stored by the UE, and is related to at least one of an overload, congestion or load, select one access network among at least one cellular access network of a second PLMN when an ANDSF indicates that the UE conditionally stays at the currently associated WLAN, if all of the at least one WLAN access network are overloaded or have been restricted for access to the predetermined time period, wherein the second PLMN is one of an EPLMN (equivalent PLMN) or a PLMN which consists of only cellular access networks, and transmit, via the transceiving module, information using the selected one access network.

* * * * *